US008312621B2

(12) United States Patent
Shahin

(10) Patent No.: US 8,312,621 B2
(45) Date of Patent: Nov. 20, 2012

(54) STABILIZER DEVICE FOR THROUGH-HOLE ELECTRICAL JACKS

(76) Inventor: Christopher John Shahin, San Jose, CA (US)

(*) Notice: Subject to any disclaimer, the term of this patent is extended or adjusted under 35 U.S.C. 154(b) by 524 days.

(21) Appl. No.: 12/572,973

(22) Filed: Oct. 2, 2009

(65) Prior Publication Data

US 2011/0078897 A1 Apr. 7, 2011

(51) Int. Cl.
*B23P 19/00* (2006.01)
*F16L 55/132* (2006.01)

(52) U.S. Cl. ................ 29/761; 29/764; 29/729; 29/758; 138/89; 138/90

(58) Field of Classification Search .................... 29/764, 29/729, 758, 761; 138/89, 90
See application file for complete search history.

(56) References Cited

U.S. PATENT DOCUMENTS

| | | | | | |
|---|---|---|---|---|---|
| 1,471,184 | A | * | 10/1923 | Miles | 138/97 |
| 2,370,840 | A | * | 3/1945 | Carlson | 72/54 |
| 2,744,269 | A | * | 5/1956 | Kerr et al. | 408/80 |
| 2,991,674 | A | * | 7/1961 | Uhl | 72/393 |
| 3,568,721 | A | * | 3/1971 | Ross et al. | 138/97 |
| 4,114,654 | A | * | 9/1978 | Richardson | 138/89 |
| 4,126,408 | A | * | 11/1978 | Cox | 431/2 |
| 4,390,042 | A | * | 6/1983 | Kucherer et al. | 138/89 |
| 4,436,117 | A | * | 3/1984 | Martin | 138/89 |
| 4,603,463 | A | * | 8/1986 | Wolbert et al. | 29/402.07 |
| 5,244,236 | A | * | 9/1993 | Ninomiya | 285/39 |

* cited by examiner

*Primary Examiner* — Derris Banks
*Assistant Examiner* — Kaying Kue
(74) *Attorney, Agent, or Firm* — Stephen E. Zweig

(57) ABSTRACT

A handheld tool device to facilitate maintenance and installation of hollow through-hole audio input jacks on electrical guitars and other electronic musical devices. The tool has an expandable tip that can be placed inside the hollow opening of the through-hole audio input jack, and then be expanded by the operator. The device enables the operator to hold the audio input jack in a fixed position while a nut or other jack fastening device is tightened. Other applications for the device include stabilizing a large variety of different through-hole connectors, embedded in a wide variety of different surfaces.

19 Claims, 5 Drawing Sheets

STABILIZER DEVICE FOR THROUGH-HOLE ELECTRICAL JACKS

BACKGROUND OF THE INVENTION

One very common problem with electronic musical instruments, such as electrical guitars and basses, is caused by the input jack that connects the instrument to various external electrical devices such as external amplifiers, speakers, and recording devices. These input jacks (often quarter inch diameter female through-hole audio jacks) are typically mounted inside the instrument in a difficult to access area. Usually only a small threaded portion of the jack bushing protrudes outside of the guitar. The jack is usually secured almost flush to the surface of the guitar by a nut and washer. An example of such input jacks is the Switchcraft quarter inch guitar input jack/amp speaker output jack.

Such guitars and jacks are connected and disconnected from external electrical devices at a high frequency, often many times a day, by way of a male plug that connects to the female jack. This connection and disconnection, along with movement of the instrument itself, ends up applying intermittent torque to the input jack. As a result, with repeated use, the jack nut starts to loosen.

Unfortunately, due to the fact that the jack and nut are usually mounted almost flush to the guitar surface, it is difficult or impossible to fix the problem by applying torque to the nut because this torque simply transfers through to the input jack, causing further unwanted jack rotation.

The net effect is that over time and use, the guitar input jack continues to twist and turn inside the guitar during each insertion and removal cycle, and this twisting can cause electrical wires connected to the internal contacts of the jack to fail. At first this failure manifests itself through unwanted noise or signal drop outs caused by the loose wires, and eventually the instrument will fail outright.

At present, methods for fixing input jacks are rather time consuming, and cumbersome. An example of a typical repair procedure consists of a series of steps such as 1) unscrewing the nut and letting the jack fall inside the guitar, 2) using a stiff wire to probe inside the guitar and attempt to hook the loose jack and pull it through the jack opening, 3) inspecting the wires and re-soldering bad connections as need be, 4) attempting to reinsert the unattached jack back into proper position using the stiff wire, 5) attempting to reinsert and tighten the nut, without twisting the jack while doing so.

Thus more satisfactory methods to address the problem of unwanted guitar jack nut loosening, jack movement, and internal wire failure are desirable.

BRIEF SUMMARY OF THE INVENTION

The invention is based on the insight that if a simple and easy to implement method could be devised to prevent the input jack (e.g. a hollow through-hole electrical jack) from rotating while the nut was tightened, then the nut could be tightened to prevent jack rotation before damage to the connecting wires occurs.

To do this, a new type of hand tool device is disclosed. This hand tool consists of an expandable (variable diameter) tip connected to a handle. The diameter of the tip can be adjusted to at least two different settings. In a first setting, the diameter of the tip is small enough so that the tip can be manually inserted into the opening of a loose input jack. In at least a second setting, the diameter of the tip is expanded to a larger diameter so that the larger diameter tip makes firm but non-destructive contact with the internal walls of the jack.

While in the absence of the hand tool device, application of torque to the guitar jack nut would transfer to the jack itself, causing undesired jack rotation, when the hand tool device is used, the results are different. The tip of the hand tool device makes firm contact (a firm grip) with the inside of the jack, stabilizing the jack. The operator, who is holding onto the handle of the hand tool device, can prevent the input jack from rotating. Thus the nut may be tightened by hand, or by pliers, wrenches, or other traditional methods, without unwanted input jack rotation and damage to the guitars' internal wires.

Once the nut has been tightened, the diameter of the tip of the hand tool device may be reduced, often back to its original smaller diameter, and the hand tool then withdrawn from the input jack. The hand tool may then be stored for future use.

In general, the invention is useful for any female through-hole electrical jack that is mounted on one side of a surface by way of a protruding hollow threaded shaft that extends through a hole in a surface, and is attached to the other side of the surface by way of a nut or other fixtures that attaches to the protruding hollow jack shaft.

Still more generally, the invention may be used as a hand-held stabilizer device for a wide variety of different types of hollow through-hole connectors, and these connectors may be connected to a wide variety of different surfaces. The invention can also help assist in a wide variety of different fastening methods. These methods can include snap fixtures and adhesives, as well as nuts.

DETAILED DESCRIPTION

Figure 1:
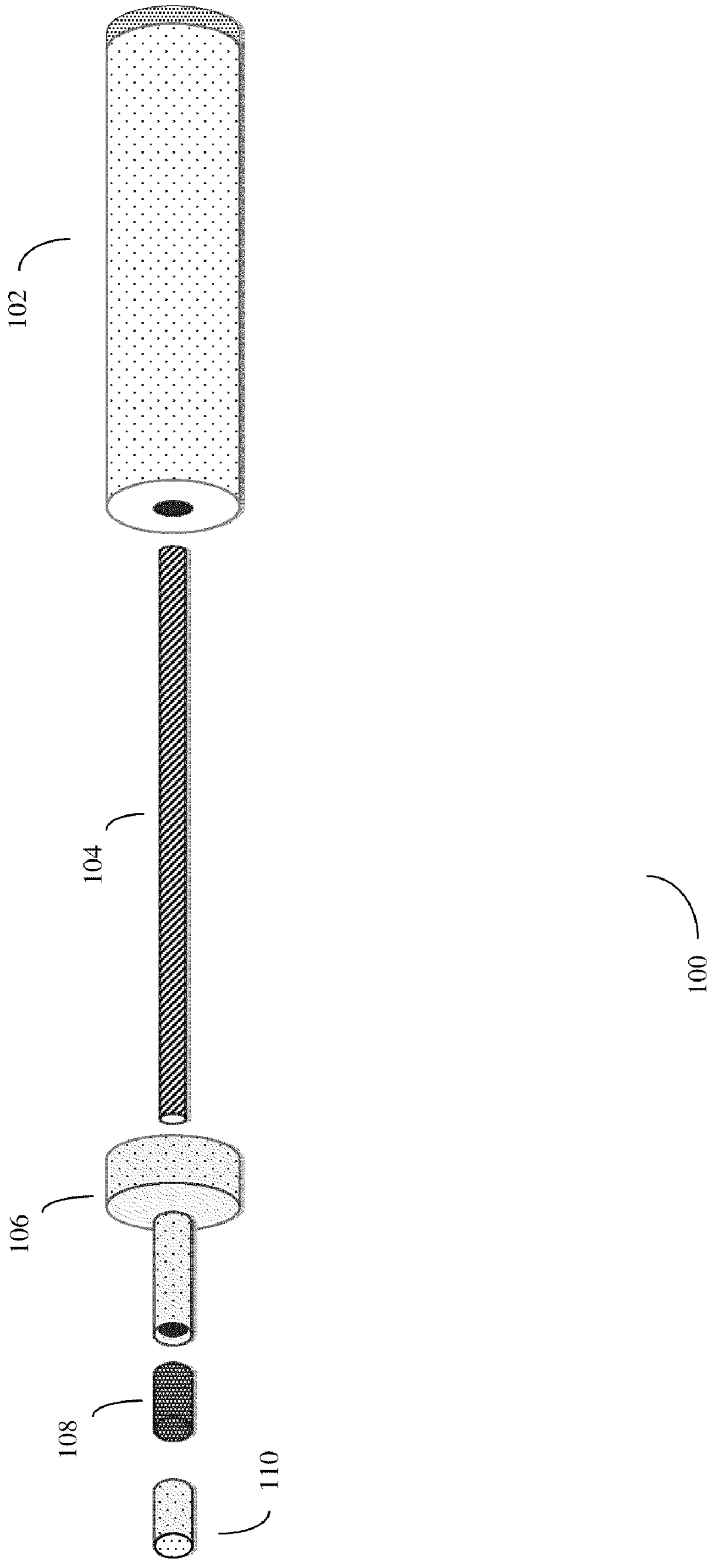
FIG. 1 shows an exploded diagram of the device

At the most general level, the invention is a hand-held stabilizer device designed to grip a hollow through-hole connector by the internal surface of the through-hole connector's hollow opening. The device holds the hollow through-hole connector in a fixed position while force or torque is applied to a fixture (such as a nut) that holds the hollow through-hole connector to an opening in essentially any type of through-hole surface.

In one embodiment, the device has as its heart, a rod with a first rod diameter, and having a distal end and a proximal end. Usually the length of the rod is selected based on the considerations not unlike those often used to determine screwdriver lengths—that is, the rod or overall device length should be large enough to be easily picked up and used by a human operator, and small enough that it does not overwhelm the human operator. Some of these considerations are discussed in further detail later in this disclosure.

The device will normally have a tip mounted at the distal end of the rod, and fixed into position so that the tip will not normally detach from the rod while the device is in use. Often the rod will have a helical screw thread (e.g. a screw thread rod). In this case, the tip may contain a hollow portion with an internal screw-thread that is complementary to the screw thread of the rod, such that the tip may be screwed onto the rod. In this case, the fixed tip will contain an internal diameter that is approximately the same as the diameter of the screw thread.

Alternatively, the fixed tip may not contain such an internal opening, and instead be affixed to the rod by other means such as welding, adhesive, or even may comprise the same structure of as the rod—that is, the rod may simply have a larger diameter at its distal end as a tip.

In either event, the fixed tip will normally have a second tip diameter that is larger than the rod's nominal first diameter. This is done so that a deformable hollow sleeve may be placed onto the rod proximal to the fixed tip, and so that the deformable hollow sleeve may be prevented from exiting the rod by the fixed tip at the distal end of the rod.

In order for the deformable hollow sleeve (often a deformable hollow cylindrical sleeve) to be prevented from exiting the rod at the distal end by the fixed tip, the deformable sleeve will normally have an internal sleeve diameter that is slightly larger than the first diameter of the rod, but will also have an external sleeve diameter that is smaller than the second tip diameter of the fixed tip. This way, the hollow deformable sleeve will be blocked from exiting the rod on the distal end by the larger diameter of the fixed tip.

The second diameter of the fixed tip, and the external sleeve diameter of the deformable hollow sleeve, will normally be selected as to both be smaller than the internal diameter of the hollow through-hole connector. This way at least the fixed tip and the deformable hollow sleeve may be easily positioned inside the hollow opening of the through-hole connector by a human operator.

The material of the deformable hollow sleeve is selected so that if the hollow sleeve is compressed, as the height of the hollow sleeve starts to shrink, the diameter of the hollow sleeve will start to expand. In particular, the relative dimensions of the hollow sleeve relative to the internal diameter of the through-hole connector, and the hollow sleeve material, are selected so that with sufficient compression, the diameter of the hollow sleeve will first match, and then start to exceed, the internal diameter of the through-hole connector. As a result, with sufficient pressure, the hollow sleeve will start to contact the inner surface of the through-hole connector with increasing force, eventually obtaining a relatively firm grip on the interior of the through-hole connector. At the same time, the compressive force on the hollow sleeve will also cause the hollow sleeve to form a firm grip on the rod, the fixed tip, and any other device, such as a hollow spool (to be discussed shortly) and optional handle attached to the rod.

The net effect is that when the deformable hollow sleeve is sufficiently compressed, it grips both the interior surface of the hollow through-hole connector, and the device itself, thus allowing the various types of forces exerted on the through hole connector to be connected to a human operator, or indeed any mass connected to the rod, and resisted by an opposing force. This opposing force can be inertia (i.e. the mass of the handle) but more usually it will be an opposing force exerted by the muscles of a human operator who is gripping the rod or handle.

Thus the hollow through-hole connector (e.g. guitar jack) can be held in a relatively constant position while various forces are applied to the through-hole connector. These various forces can be torque (often applied by accident if a nut is used to attach the through-hole connector to a surface), or other type of force, such as the force accidentally exerted if an alternative type of fixture, such as a snap connector, adhesive, or other means is used to attach the through-hole connector to the surface.

Various means may be used to apply compressive force to the deformable hollow sleeve. One convenient method is to mount a hollow spool on the rod in a position that is proximal to the hollow sleeve. This hollow spool may be of various shapes and configurations, but often will consist of a cylindrical shape, such as two joined cylinders, with a first cylindrical shape being configured to be conveniently manipulated by the fingers and/or hand of a human user, and a second smaller diameter configured to conveniently apply pressure to the deformable hollow sleeve. This pressure may be applied by various means. If the rod has a screw thread, then one convenient way to do this is to use a hollow spool with an internal opening that has a complementary screw thread, in which case torque applied to the hollow spool by a human user will cause the hollow spool to advance along the rod towards the distal end of the rod, eventually putting pressure on the deformable hollow sleeve. However alternative methods of putting pressure (i.e. a compressive force) upon the deformable hollow sleeve may also be used.

The hollow spool need not be cylindrical. In alternative embodiments, the hollow spool may be have a rectangular, square, pentagonal, etc. cross section, and it should be clear that such alternative shapes will generally also function adequately.

The following figures and discussion focuses on some specific embodiments of the invention. Here these specific embodiments are designed to stabilize one-quarter inch female through-hole audio connector jacks, attached by a nut to a hole in the surface of a musical instrument, such as an electrical guitar or base. In these examples, the rod has a helical screw thread, and the fixed tip may or may not have an internal screw thread and diameter complementary to that of the rod. In this embodiment, the deformable hollow sleeve is cylindrical and made out of an elastic polymeric material. The hollow spool has an internal diameter and screw thread complementary to that of the rod. Here also, the hollow spool is has a structure composed of a large cylinder at one end, designed for easy adjustment by a human operator's hand and fingers, and a small cylinder at the other end, designed to apply pressure to the deformable hollow sleeve. In these embodiments, the device also has a handle, designed for easy gripping by a human operator, on the extreme proximal end of the rod.

FIG. 1 shows an exploded diagram of one embodiment of the device (100). In this embodiment, the device consists of a handle (102), a screw-thread (threaded) rod (104), a hollow spool (106) (often containing an internal thread complementary to the thread of the threaded rod), a deformable hollow sleeve (108), and a fixed tip (110), often with an internal thread that matches the thread of the threaded rod (104). The handle (102) itself may either contain an internal thread complementary to the thread of the threaded rod. Alternatively the threaded rod (104) may be glued or mounted into the handle by other means. The entire device (100) is intended to be small enough to be held in one hand, and when assembled is roughly the size of a standard screwdriver—e.g. often about 3 to 7 inches long, and about 1" in diameter at the handle. Of course the size may vary considerably outside these rough ranges, and still be within the scope of the invention.

Figure 2:
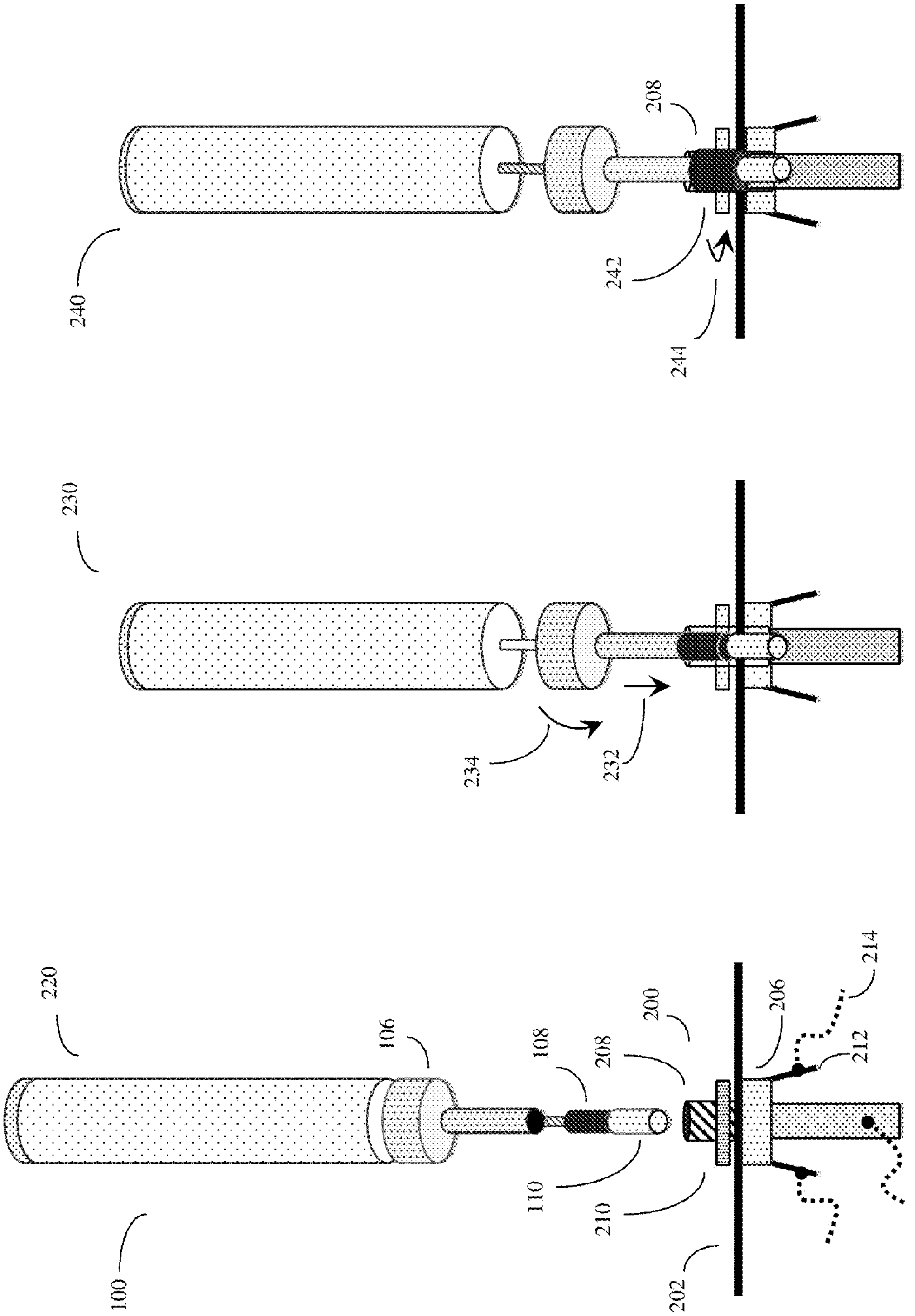
FIG. 2 shows a diagram of showing how the device prevents a guitar jack from rotating while the nut holding the guitar jack flush against a guitar is tightened.

FIG. 2 (220) shows a diagram of the device (100) interacting with a through-hole female (hollow) guitar jack (200) embedded in a hole in the surface (202) of a guitar, or other instrument. Here the guitar jack is shown in a simplified manner as consisting of the main body of the jack (206), normally below the surface of the guitar (202). A hollow cylindrical guitar jack shaft (208), designed to accommodate a male input jack (not shown), normally will protrude outside of the guitar. This hollow cylindrical guitar jack shaft will often have screw threads, and the guitar jack is secured into position by nut (210) and washer arrangement. Here only the nut (which has internal screw threads) is shown.

Normally several electrodes (212) will protrude out from the body of the guitar jack, and these electrodes are connected (usually soldered) to wires (214) that lead to the guitar pickups, and other internal guitar wiring. If the jack (200) rotates, the connections between the wires (214) and the electrodes (212) can become damaged, leading to the failure of the instrument. In this example, a ¼" female electrical guitar jack input is shown.

In this diagram, there is a gap between the nut (210) and the surface (202), causing the guitar jack (200) (206) to be somewhat loose. Application of torque to the nut (210), however, will cause the body of the guitar jack (206) to rotate, causing the electrodes to move (212), and damaging the connection between the electrodes (212) and the wires (214).

To tighten the nut (210) without causing the body of the jack (206) to rotate, the operator has positioned the tip of the device (110) above the hollow jack shaft (208). In this first configuration, the threaded hollow spool (106) on the expandable device is retracted, and thus does not put any pressure on the deformable hollow sleeve (108). As a result, the deformable hollow sleeve (108) is in a relaxed, small diameter configuration, and is able to easily enter into the hollow shaft (208) of the guitar input jack. This is shown in (230). Note that in (230) and (240), the guitar jack (200), (208), (206) is shown as being semi-transparent in order to facilitate visualization of the events taking place inside the internal hollow shaft of the guitar jack (208).

The operator will normally hold the handle of the device in the palm of his or her hand, and advance or retract (232) the internally threaded hollow spool along the threaded rod with one or more fingers (not shown), often by applying torque to the spool (234).

As is shown in (240), as the operator advances the spool (232), (234), the spool starts to exert pressure on the deformable hollow sleeve on one side, and on the other side, the rubber sleeve meets the tip of the device (which may also be threaded and screwed into the threaded rod, or alternatively be permanently affixed by glue, solder, other means. As a result, as the spool is advanced, the rubber sleeve is compressed, and it starts to expand in diameter (242).

Eventually, the deformable hollow sleeve (108) expands to the point where it applies pressure upon the inner wall of the hollow cylindrical shaft of the guitar jack (208). When this happens, torque applied to the guitar jack during attempts to tighten the nut (244) may be resisted by the operator holding the handle (102) of the device.

Figure 3:
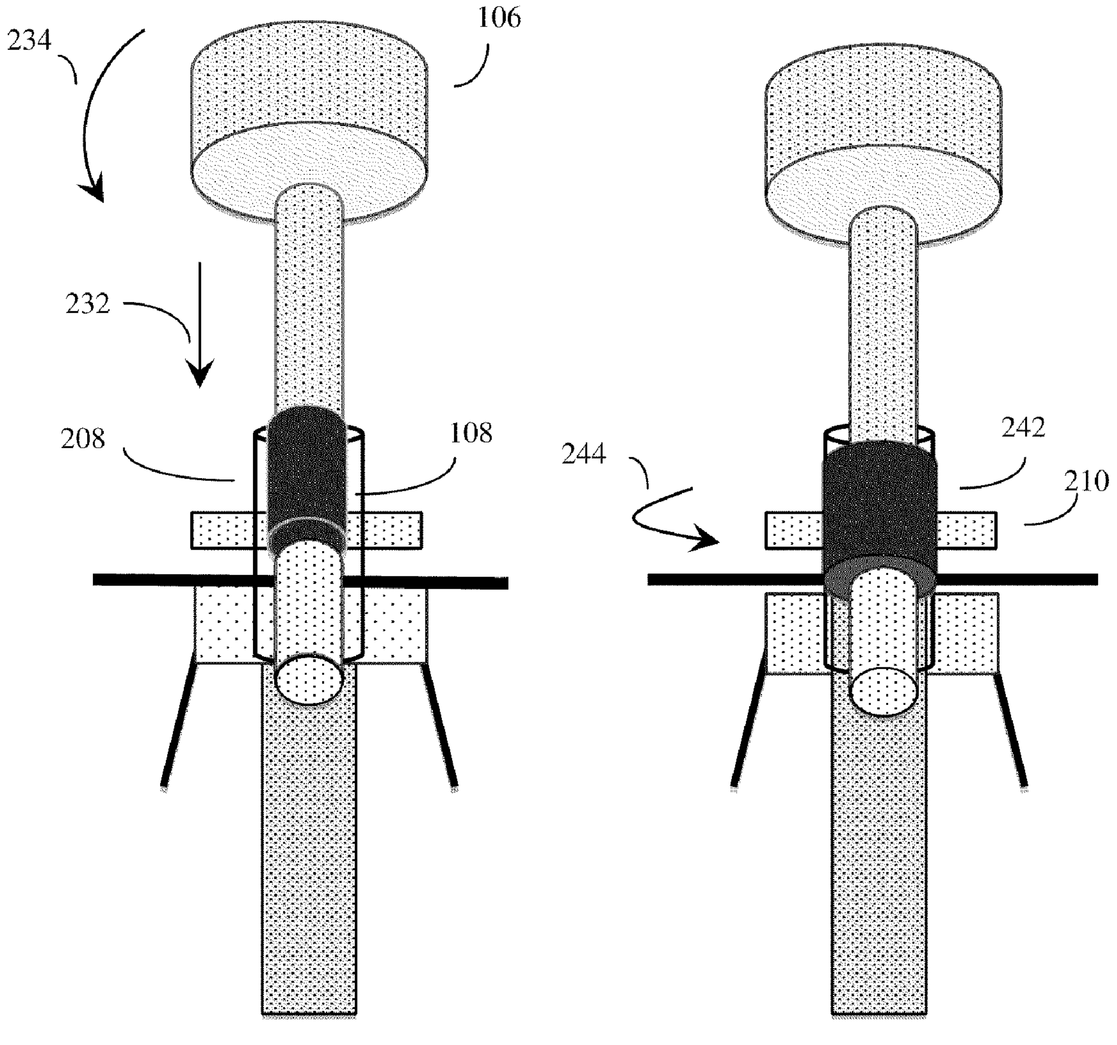
FIG. 3 shows a close up of the device's expandable rubber sleeve in operation.

FIG. 3 shows a close up of these events.

Figure 4:
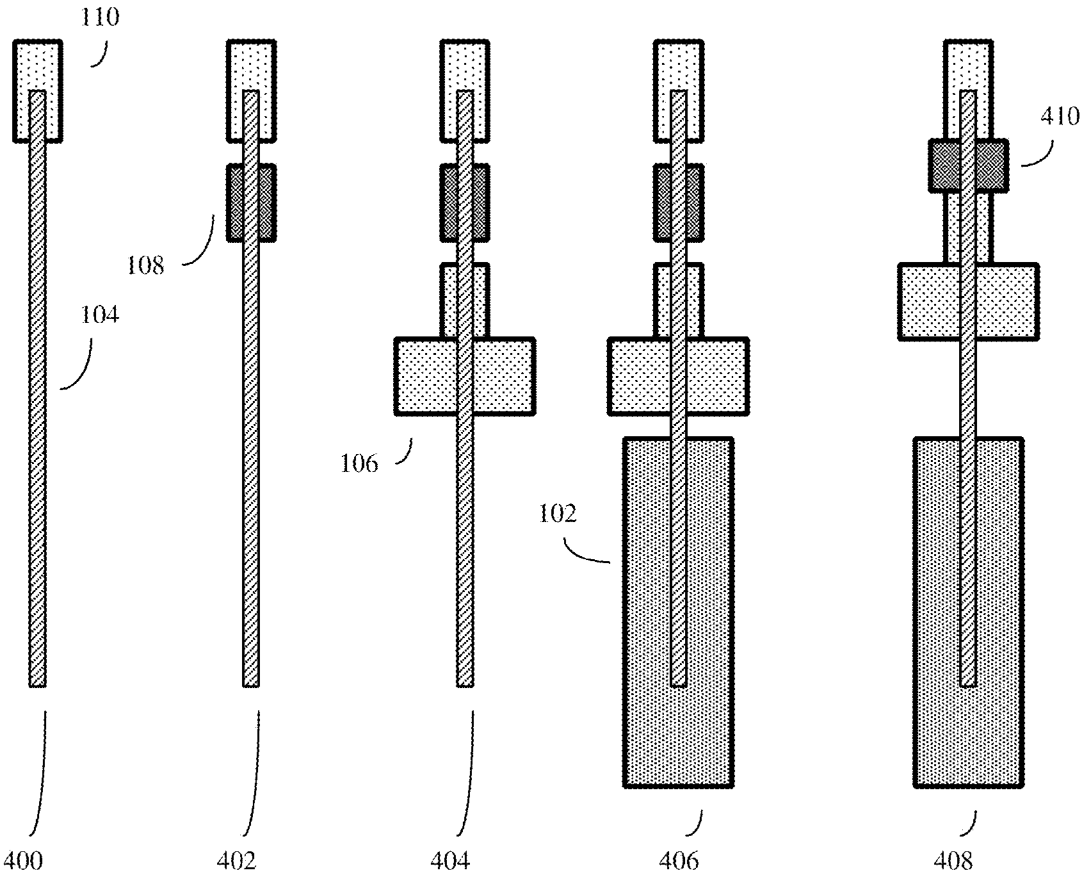
FIG. 4 shows one way in which the device may be assembled.

FIG. 4 shows one way in which the device may be constructed. In the first step (400), the tip (110), which may be composed of aluminum, steel, rigid plastic, or other material, is attached to the threaded rod (104). In the second step (402), the deformable hollow sleeve (108) is mounted on the rod. In the third step, the hollow spool (106) is threaded onto the rod, and in the fourth step, the handle (408) is attached to the rod. In this specification, the tip (110) side of the device is the distal side, and the handle (408) side of the device is the proximal side.

In (408), the effect of torque or force on the hollow spool is shown. The hollow spool (106) is pressing against the deformable hollow sleeve (108), causing the sleeve to compress, and expand its diameter to the point (410) where it now is larger than the diameter of the tip (110).

Figure 5:
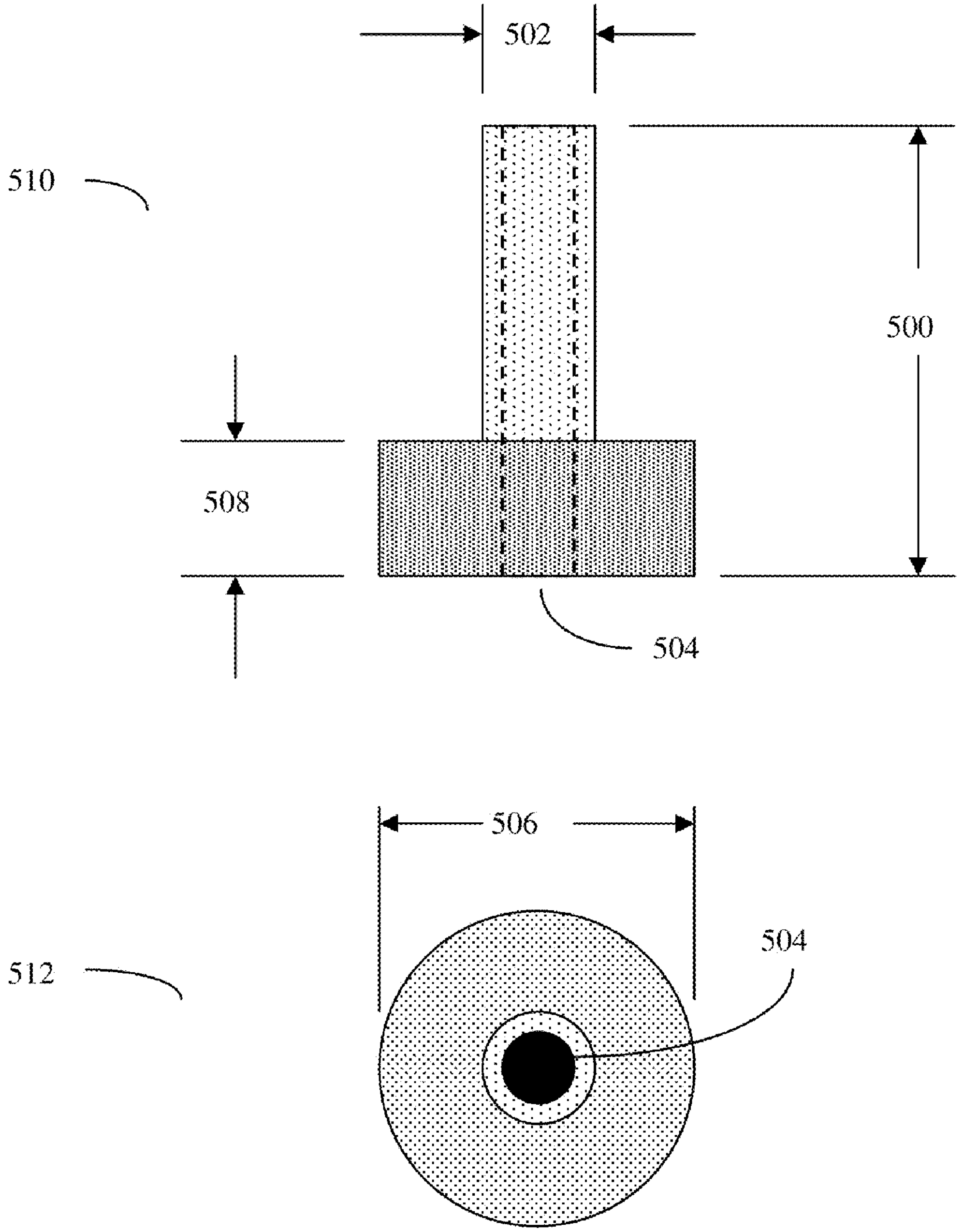
FIG. 5 shows a close up of one embodiment of the hollow spool component of the device.

FIG. 5 shows one particular embodiment of the hollow spool (106). In this embodiment, the height of the spool (500) is one inch, and the diameter of the face of the spool facing the deformable hollow sleeve (sleeve face 502) is 0.25 inches. Here this sleeve face is a cylindrical sleeve face. There is an 8⁄32 threaded hole (about 0.1650 inches in diameter) (504) extending through the spool designed to accommodate an 8⁄32 threaded rod (not shown). At the wide end, the spool has a base diameter of about 0.70 inches (17.75 mm) (506). This wider portion of the spool extends up in height about 0.30 inches (7.5 mm) (508). The side view of the hollow spool is shown as (510), and the top view of the hollow spool is shown as (512).

Although the example of a hollow (female) audio electrical jack for an electrical musical device, such as electronic musical instruments (e.g. electronic guitars, electronic basses, electronic pianos), and electronic support devices for these electronic instruments (e.g. amplifiers, recorders, sound processors) will be used throughout this specification as a specific example of one type of application and embodiment for the device, these specific examples are not intended to be limiting.

As previously discussed, in principle, the device disclosed herein may be used to help manage a broad number of different hollow through-hole connectors, attached to a variety of different through-hole surfaces, and held into position by a variety of different fixtures, including one or more nuts and washers, but also by other different fixtures such as snap-on fixtures, or even adhesives such as glues. The general problem that is being solved is the problem of how a human user can use a hand-held device to facilitate holding a through-hole connector in a relatively steady manner while the through-hole connector is being attached or bonded to a through-hole surface by a nut or some alternative type of snap-on fixture, adhesive, or other mechanism. This general type of attachment scheme will be termed a "fixture".

Similarly, although many specific embodiments of the disclosed device utilize a rod with a proximal and distal end, typically between 1" to 12" in length, and often between 2" to 8" in length, and even more conveniently between about 3" to 6" in length as one embodiment, in principle rods with greater or shorter length may also be used.

Often such rods will have a helical screw thread so that other components, such as tips with internal screw thread openings, hollow spools with internal screw thread openings, and handles with internal screw thread openings can be conveniently threaded onto the rod. However other embodiments are also within the spirit of the invention. For example, in one alternative embodiment, the rod need not have screw threads, and the operator may instead apply downward force to a hollow spool by squeezing a handle that, when squeezed, exerts downward force.

Thus in a screw threaded rod embodiment, the operator will often operate the device by applying rotary force (torque) to a hollow spool with an internal thread, and the interaction between the screw threads on the rod and the screw threads on the interior of the hollow spool will cause the hollow spool to move and exert a downward deforming force on a deformable hollow sleeve. By contrast, in a non-screw threaded rod embodiment, the non-rotary force of the operator is converted to a downward motion of the hollow spool without rotary motion. Note that in this non-screw threaded embodiment, the hollow spool may be part of the handle of the device. Thus although in many embodiments, the hollow spool will often be different from the handle of the device, this is not always the case.

In such alternative embodiments, the distal tip and/or the handle may be affixed to the rod by alternative means, such as a by distinctive bent or larger diameter proximal or distal end of the rod that acts to trap the tip and/or handle, as well as adhesives, welding, or other material bonding process.

The rod itself will often be made of a relatively durable metal or metal alloy, similar to the metals normally used for screws and durable rods, such as various aluminum, steel, copper, bronze or other metallic alloys. Alternatively durable plastics may also be used.

The deformable hollow sleeve will frequently be made of an organic (carbon based) or inorganic (e.g. silicon based) polymer, often elastic in nature. In general the hollow sleeve will comprise a material, such as a deformable polymer, that is substantially solid but flexible under normal room temperature operating conditions. Examples of suitable materials include various natural or synthetic rubbers (e.g. organic polymers, silicon based polymers), polyurethane, and the like.

Similarly, although in many embodiments, the deformable hollow sleeve may be cylindrical, this need not always be the case. This is because a deformable hollow sleeve in other cross sectional shapes, such as a triangle, rectangle, pentagon, etc. will frequently also deform and grip the interior hollow surface of a connector in an adequate manner.

Similarly the handle of the device need not always be present. However a handle is generally preferable because it allows the operator to maintain a good grip on the device. If present, the handle will usually be made of a durable material. Here again, metals or metal alloys such as aluminum, steel, or other metallic alloys may be used. Durable plastics may also be used, as well as materials traditionally used in handles such as wood, bone, ivory, rock or other material.

The invention claimed is:

1. A hand-held stabilizer device for gripping a hollow through-hole connector by the internal surface of the through-hole connector's hollow opening, and holding the hollow through-hole connector in a fixed position while force is applied to a fixture holding said hollow through-hole connector to an opening in a through-hole surface, comprising:

a non-hollow rod with a first rod diameter, a distal end, a proximal end, with a fixed tip on the distal end;

said fixed tip having a second tip diameter larger than said first rod diameter; a deformable hollow sleeve with an internal sleeve diameter larger than said first rod diameter, and an external sleeve diameter smaller than said second tip diameter when said deformable hollow sleeve is not deformed;

said deformable hollow sleeve mounted on said rod proximal to said fixed tip; a hollow spool configured to allow said hollow spool to mounted on said rod proximal to said deformable hollow sleeve;

said hollow spool having a sleeve face facing said deformable hollow sleeve; said sleeve face having an external sleeve face diameter equal to or larger than said external sleeve diameter;

wherein said tip and said deformable hollow sleeve may be inserted into an opening in said hollow through-hole connector;

wherein application of force to said hollow spool causes said hollow spool to advance along said rod towards said deformable hollow sleeve, causing said deformable hollow sleeve to press up against said fixed tip, and subsequently deform;

wherein the diameter of said deformable hollow sleeve when deformed becomes substantially larger than said second tip diameter, thus gripping an internal surface of the through-hole connector's hollow opening; and wherein force communicated to said hollow through-hole connector when force is applied to said fixture is further communicated up said rod to a larger mass capable of imparting substantial resistance to rotary motion of said hollow through-hole connector.

2. The device of claim 1, wherein said connector is an electrical jack.

3. The device of claim 1, wherein said fixture comprises at least one nut.

4. The device of claim 1, wherein said rod is a screw-thread rod, said hollow spool has an internal screw-thread, said hollow spool is threaded over said screw-thread rod, and said force is torque.

5. The device of claim 1, wherein said deformable hollow sleeve is a deformable hollow cylindrical sleeve.

6. The device of claim 1, further comprising a fixedly attached handle on the extreme proximal end of said rod.

7. The device of claim 1, in which said larger mass is provided by the fingers and hand of a human operator.

8. A hand-held stabilizer device for gripping a hollow through-hole electrical-jack by the internal surface of the through-hole electrical-jack's hollow opening, and holding the hollow through-hole electrical-jack in a fixed position while torque is applied to a nut holding said hollow through-hole electrical-jack to an opening in a through-hole surface, comprising:

a screw-thread rod with a first rod diameter, a distal end, a proximal end, with a fixed tip on the distal end;

said fixed tip having a second tip diameter larger than said first rod diameter; a deformable hollow cylindrical sleeve with an internal sleeve diameter larger than said first rod diameter, and an external sleeve diameter smaller than said second tip diameter when said deformable hollow cylindrical sleeve is not deformed;

said deformable hollow cylindrical sleeve mounted on said screw-thread rod proximal to said fixed tip;

a hollow spool with an internal screw-thread, configured to allow said hollow spool to be threaded over said screw-thread rod, and mounted on said screw-thread rod proximal to said deformable hollow cylindrical sleeve;

said hollow spool having a cylindrical sleeve face facing said deformable hollow cylindrical sleeve;

said cylindrical sleeve face having an external sleeve face diameter equal to or larger than said external sleeve diameter;

in which said hollow spool additionally comprises a structure with at least a larger external diameter cylinder to receive torque pressure from the fingers of a human operator, and a smaller external diameter cylinder configured to apply pressure to said deformable hollow cylindrical sleeve;

wherein said tip and said deformable hollow cylindrical sleeve may be inserted into an opening in said hollow through-hole electrical jack;

wherein application of torque to said hollow spool causes said hollow spool to advance along said screw-thread rod towards said deformable hollow cylindrical sleeve, causing said deformable hollow cylindrical sleeve to press up against said fixed tip, and subsequently deform;

wherein the diameter of said deformable hollow cylindrical sleeve when deformed becomes substantially larger than said second tip diameter, thus gripping an internal surface of the through-hole electrical-jack's hollow opening;

and wherein torque communicated to said hollow through-hole electrical-jack when torque is applied to said nut is further communicated up said screw-thread rod to a larger mass capable of imparting substantial resistance to rotary motion of said hollow through-hole electrical-jack.

9. The device of claim 8, further comprising a fixedly attached handle on the extreme proximal end of said screw-thread rod.

10. The device of claim 8, in which said hollow through-hole electrical-jack is a ¼" female audio jack.

11. The device of claim 8, in which said opening in a through-hole surface is located on a musical instrument.

12. The device of claim 11, in which the musical instrument is a guitar or bass.

13. The device of claim 8, in which said opening in a through-hole surface is located on an audio amplifier.

14. The device of claim 8, in which said deformable hollow cylindrical sleeve comprises one or more deformable polymers.

15. The device of claim 14, in which said deformable polymers are selected from the group consisting of organic polymers, silicon based polymers, rubber, or polyurethane.

16. A hand-held stabilizer device for gripping a hollow through-hole electrical-jack by the internal surface of the through-hole electrical-jack's hollow opening, and holding the hollow through-hole electrical-jack in a fixed position while torque is applied to a nut holding said hollow through-hole electrical-jack to an opening in a through-hole surface, comprising:

a screw-thread non-hollow rod with a first rod diameter, a distal end, a proximal end, with a fixed tip on the distal end;

said fixed tip having a second tip diameter larger than said first rod diameter;

a deformable hollow cylindrical sleeve with an internal sleeve diameter larger than said first rod diameter, and an external sleeve diameter smaller than said second tip diameter when said deformable hollow cylindrical sleeve is not deformed;

said deformable hollow cylindrical sleeve mounted on said screw-thread rod proximal to said fixed tip;

a hollow spool with an internal screw-thread, configured to allow said hollow spool to be threaded over said screw-thread rod, and mounted on said screw-thread rod proximal to said deformable hollow cylindrical sleeve;

said hollow spool having a cylindrical sleeve face facing said deformable hollow cylindrical sleeve;

said cylindrical sleeve face having an external sleeve face diameter equal to or larger than said external sleeve diameter;

in which said hollow spool additionally comprises a structure with at least a larger external diameter cylinder to receive torque pressure from the fingers of a human operator, and a smaller external diameter cylinder configured to apply pressure to said deformable hollow cylindrical sleeve;

a handle mounted on said rod proximal to said hollow spool;

wherein said tip and said deformable hollow cylindrical sleeve may be inserted into an opening in said hollow through-hole electrical jack;

wherein application of torque applied by the fingers and hand of a human operator to said hollow spool causes said hollow spool to advance along said screw-thread rod towards said deformable hollow cylindrical sleeve, causing said deformable hollow cylindrical sleeve to press up against said fixed tip, and subsequently deform;

wherein the diameter of said deformable hollow cylindrical sleeve when deformed becomes substantially larger than said second tip diameter, thus gripping an internal surface of the through-hole electrical-jack's hollow opening;

and wherein torque communicated to said hollow through-hole electrical-jack when torque is applied to said nut is further communicated up said screw-thread rod to said fingers and hand of a human operator, thus supplying a mass capable of imparting substantial resistance to rotary motion of said hollow through-hole electrical-jack;

in which said through-hole electrical jack is a ¼" female audio jack; and said surface is the surface of a musical device.

17. The device of claim 16, in which said musical device is selected from the group consisting of electronic musical instruments, electronic support devices for said musical instruments, electronic guitars, electronic basses, electronic amplifiers, electronic audio recorders, and electronic sound processing devices.

18. The device of claim 17, in which said deformable hollow cylindrical sleeve comprises a one or more deformable polymers selected from the group consisting of organic polymers, silicon based polymers, rubber, or polyurethane.

19. The device of claim 1, in which said hollow spool comprises a structure with at least a larger external diameter cylinder to receive torque pressure from the fingers of a human operator, and a smaller external diameter cylinder configured to apply pressure to said deformable hollow cylindrical sleeve.

* * * * *